United States Patent [19]

Rowe

[11] 4,294,219

[45] Oct. 13, 1981

[54] FUEL HEATING SYSTEM FOR AN ENGINE

[76] Inventor: Bryant T. Rowe, P.O. Box 605, Louisburg, N.C. 27549

[21] Appl. No.: 70,017

[22] Filed: Aug. 27, 1979

[51] Int. Cl.³ .............................................. F02M 31/00
[52] U.S. Cl. .................................................... 123/557
[58] Field of Search .................. 123/557, 558; 165/51, 165/52

[56] References Cited

U.S. PATENT DOCUMENTS

| | | | |
|---|---|---|---|
| 3,110,296 | 11/1963 | Lundi | 123/557 |
| 3,354,872 | 11/1967 | Gratzmuller | 123/557 |
| 3,472,214 | 10/1969 | Moon | 123/557 |
| 3,509,859 | 5/1970 | Pantano | 123/557 |
| 4,072,138 | 2/1978 | Hawkins | 123/557 |
| 4,091,782 | 5/1978 | Dunnam | 165/51 |
| 4,180,036 | 12/1979 | Wolf | 123/557 |

*Primary Examiner*—Ronald H. Lazarus
*Attorney, Agent, or Firm*—Mills & Coats

[57] ABSTRACT

The present invention relates to a fuel heating system for an engine comprising a cylindrical fuel chamber having a heating line extended centrally through the same and communicatively connected to the engine cooling system. Provided on opposite ends of the fuel chamber are inlet and outlet gas ports that allow fuel to be directed to and into the fuel chamber where the same is heated by the fluid of the engine cooling system passing centrally through the fuel chamber via the heating line. As the fuel is heated up to approximately 160 degrees farenheit, it is then directed from the outlet gas port directly into the carburetor of the engine.

1 Claim, 2 Drawing Figures

FUEL HEATING SYSTEM FOR AN ENGINE

The present invention relates to combustion engines, and more particularly to a device and system for heating fuel to expand prior to induction into the engine through the carburetor for improving engine performance and fuel economy.

BACKGROUND OF THE INVENTION

In recent years, most everyone has become aware of our energy problems and the need to conserve energy. No where has the problem been more apparent and dramatic than at gasoline service stations. The rising cost of gasoline and the scarcity of the same at times have caused most people to become very conscientious of efficiently utilizing fuel and the need to take steps to conserve the same.

In this regard, there has been much research and development in the area of improving performance and fuel economy of internal combustion engines. One particular area that has gained considerable attention deals with preheating the gasoline prior to its induction into the engine carburetor. For example, one is referred to the disclosures found in the U.S. Pat. Nos. 3,986,486; 3,253,647; and 3,699,938. All of these patents relate to devices and systems for preheating to expand gasoline to improve the combustion efficiency thereof and to generally improve the performance characteristics of the engine.

While such devices are capable of improving performance and fuel economy, they are often not very practical inasmuch as they are often complicated and expensive. There exists a need for a system for preheating fuel prior to induction through the engine carburetor that is practical, easy to install, and which is relatively inexpensive.

SUMMARY OF THE INVENTION

The present invention entails a device and associated system for preheating gasoline prior to induction through the engine carburetor that is simple, easy to install and maintain, and which is relatively inexpensive. The device of the present invention comprises a generally cylindrical fuel chamber having a heating line extending centrally therethrough and communicatively connected with the engine cooling system that continuously directs a flow of fluid from the engine cooling system through the fuel chamber. Also provided about opposite ends of the fuel chamber is an inlet gas port and an outlet gas port, with the inlet gas port being communicatively connected to the fuel pump and the outlet gas port being directly connected to the engine carburetor. Fuel is pumped into the fuel chamber and because of its capacity there is an accumulation of fuel within the fuel chamber that is heated by the continuous flow of engine coolant fluid passing centrally therethrough. The heat from the engine coolant fluid is transferred to the fuel chamber and to the fuel therein causing the fuel to raise in temperature to approximately 160 degrees farenheit in the preferred embodiment herein disclosed, where the fuel at this temperature is generally directed from the fuel chamber into the carburetor. This substantially increases fuel economy from approximately 15 percent to 40 percent and significally improves engine performance by giving rise to a more complete and efficient combustion process, thereby reducing pollutant emissions.

It is therefore an object of the present invention to provide a fluid preheating system for a combustion engine that is simple, reliable, easy to install and maintain, and which is relatively inexpensive.

A further object of the present invention resides in the provision of a fuel preheating system that is provided with a fuel chamber adapted to hold a volume of fuel so as to continually maintain a reserve of preheated fuel.

Still a further object of the present invention resides in the provision of a fuel preheating system that is adapted to work in conjunction with all combustion type engines for all types of cars, trucks, and other types of vehicles.

Another object of the present invention is to provide a fuel preheating system that is capable of providing a continuous output of heated fuel at 160 degrees farenheit, and which is further adapted to be adjustably orientated to provide 160 degree farenheit fuel for cooling systems having different thermostat controls settings.

Also, another object of the present invention resides in the provision of a fuel preheating system for a combustion engine of the character described above which is adapted to be adjustably orientated to produce heated liquid fuel or vapor, or a combination thereof.

Still a further object of the present invention resides in the provision of a fuel preheating system for a combustion engine of the character described that increases the power of the engine, improves the performance of the engine, maintains spark plugs in a clean state, allows low octane gasoline to perform like high octane gas, reduces and in most cases, stops spark knock, reduces pollution, and generally contributes to overall improved performance of the engine.

Still a further object of the present invention is to provide a fuel preheating chamber of the character described above which generally acts to continuously expand the gas prior to induction into the engine carburetor in order that the volume of gas can be more effectively and efficiently utilized by the engine during the combustion process.

It is also an object of the present invention to provide a fuel preheating system for a combustion engine of the character described above wherein the fuel chamber will keep gas heated or warm from 2 to 5 hours even after the engine is shut down, therefore, reducing the need for the carburetor choke to be used except on rare occasions and except when the engine is first started in the morning, thereby saving gas and preventing sluggish warm-up time which often causes the engine to shut off even in the pathway of oncoming traffic.

Finally, it is an important object of the present invention to provide a fuel preheating device that will actually increase the gasoline mileage from 15 to 40 percent on all types of vehicles, thereby reducing the operating cost of the vehicle.

Other objects and advantages of the present invention will become apparent from a study of the following description and the accompanying drawings which are merely illustrative of the present invention.

DESCRIPTION OF THE PREFERRED EMODIMENT

Figure 1:
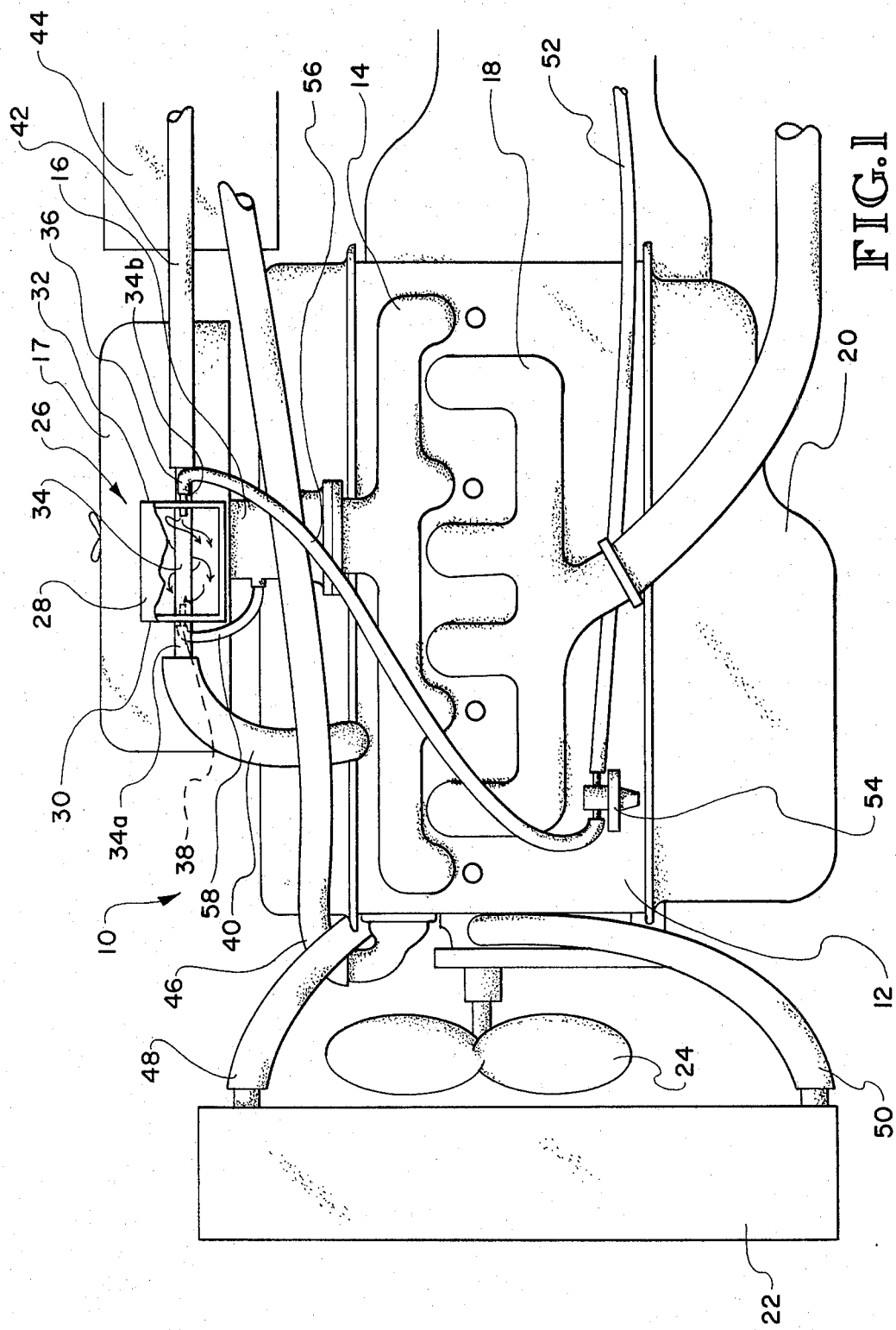
FIG. 1 is a side elevational view of the fuel preheating system of the present invention installed on an engine with the fuel chamber thereof being shown in section.

With further reference to the drawings, the fuel preheating system of the present invention is shown in conjunction with an internal combustion engine, indicated generally by the numeral 10. For the sake of a complete and unified understanding of the fuel preheating system, a brief discussion will be directed to the internal combustion engine 10 and its basic components as they relate to the fuel preheating system of the present invention.

In this regard, engine 10 includes a block 12 having an intake manifold 14 associated therewith, and a conventional carburetor 16 with an air filter housing 17 disposed thereover. In addition, engine 10 further includes an exhaust manifold 18, an oil pan 20, a radiator 22, and a radiator fan 24 that is driven by the crankshaft of the engine 10. Details of these basic engine components is not dealt with herein in detail because such is not material per se to the present invention, and further because the basic structure and operation of the internal combustion engines is well known and appreciated by those skilled in the art.

Turning to the present invention, the fuel preheating system of the present invention is adapted to be mounted about the engine directly adjacent to carburetor 16, and during operation will function to heat gasoline being directed to the carburetor. The fuel preheating system comprises a cylindrical fuel chamber indicated generally by the numeral 26, that has a cylindrical wall 28 and two ends 30 and 32.

Figure 2:
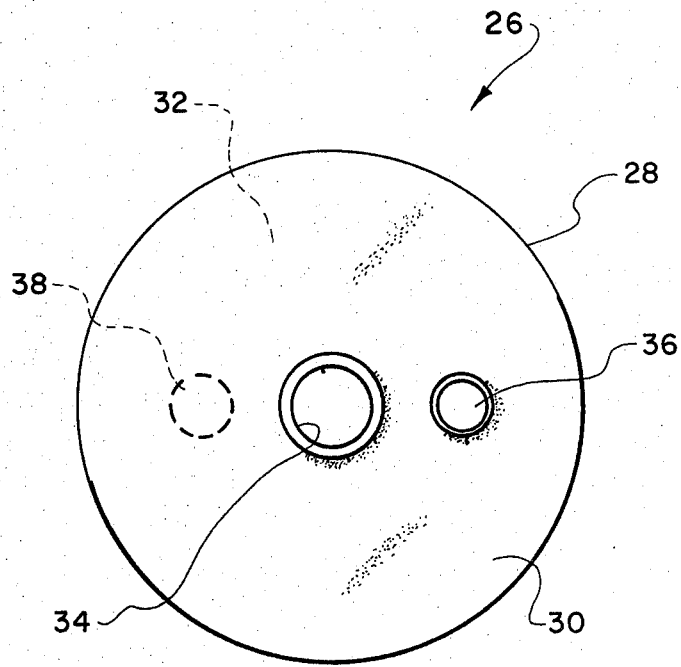
FIG. 2 is an end elevational view of the fuel chamber of the fuel preheating system of the present invention.

Centrally extending through the fuel chamber 26 is a heating line 34 in the form of a conduit, with the heating line including an inlet end 34a and an outlet end 34b. Formed about opposite ends 30 and 32 of the fuel chamber 26 is an inlet gas port 36 and an outlet gas port 38. From FIG. 2, it is seen that the heating line 34 and inlet and outlet gas ports 36 and 38 are generally disposed in alignment, with the inlet gas port 36 being disposed about the opposite side of the longitudinal axis of the heating line 34 with respect to the outlet gas port 38. The significance of this design will be appreciated from subsequent portions of this disclosure.

To form the fuel preheating system, the inlet end 34a of the heating line 34 is connected to a hot line 40 of the cooling system, the hot line being that line immediately leaving the engine where the coolant fluid is the hottest. Outlet end 34b of heating line 34 is connected to an inlet heater hose 42 that is directed to a heater 44 that would typically be associated with the vehicle and internal combustion engine 10. From heater 44, the coolant fluid is directed by a return line 46 to a water pump associated with the engine 10 where the coolant fluid is pumped through line 48 to radiator 22. As the water or coolant fluid moves down the radiator 22, the same is cooled and pumped through line or hose 50 back to the engine 10 where the same continues to circulate through the engine and through the flow path just described.

From the vehicle gas tank (not shown), a fuel line 52 extends towards the engine and connects to a fuel pump 54 through which fuel is pumped into a fuel feeder line 56 that is operatively connected to the fuel inlet port 36 of the fuel chamber 26. As fuel is pumped into the fuel chamber 26, it is appreciated that fuel is allowed to accumulate therein.

Connected to the outlet gas port 38 is a delivery line 58 that is directed to the carburetor 16.

In operation, it is thusly appreciated that the interior of the fuel chamber 26 includes an accumulation of gasoline that is supplied from the fuel pump 54 through the feeder line 56 into the inlet gas port 36. This accumulation of gasoline is continuously heated by the coolant fluid passing from hose 40 through heating line 34 and on into the inlet heater hose 42. As the hot coolant fluid passes through the fuel chamber 26, heat associated therewith is transferred essentially by conduction to the surrounding gasoline held and contained in fuel chamber 26.

The size of the fuel chamber 26 is designed such that under ordinary operating conditions for a certain size engine, that the heat transfer from the radiator cooling system would be sufficient to heat the exiting gasoline from the fuel chamber to a temperature of approximately 160° F. To help maintain this exiting gasoline temperature, it is seen that the outlet gas port 38 is positioned on end 30 of the fuel chamber 26 directly adjacent to inlet end 34a of the heating line 34. This assures that the exiting gasoline will be leaving the hottest area of the fuel chamber 26.

One very important feature of the present invention and particularly the fuel chamber 26, is that the level of the outlet gas port 38 can be easily and conveniently varied by rotating the entire fuel chamber 26 about the axis of the heating line 34. This is important because the state of the gasoline being delivered to the carburetor can be varied by selectively positioning outlet gas port 38 with respect to the inlet gas port 36. For example, gasoline assuming a more vapor state can be provided by rotating the fuel chamber 26 about the axis of the heating line 34 such that the outlet gas port 38 assumes a relatively high elevated position with respect to the axis of heating line 34. In the preferred embodiment disclosed herein where the engine thermostat is set at 195° F., the outlet gasoline directed to the carburetor will generally be approximately 160° F. when the outlet and inlet ports 38 and 36 are generally disposed level with respect to each other. Where the engine thermostat is 180°, in order for the exiting gasoline to be approximately 160° F., the axis of the outlet gas port 38 should be raised approximately one and one-fourth inches above the axis of the inlet gas port 36. Likewise, where the engine thermostat is 160° F., the axis of the outlet port 38 should be approximately two and one-half inches above the axis of the inlet gas port 36. It should be kept in mind that this is based on the fuel chamber being approximately five inches in diameter and three inches long. It will be understood and appreciated, however, that the temperature of the exiting gas can be adjusted and regulated by the selective positioning of the outlet gas port 38 as outlined above. The degree of adjustment will most often have to be done on an individual basis because the size and shape of the fuel chamber 26 may change and vary as well as other variables in the system.

From the forgoing, it is appreciated that the present invention presents a simple, practical, and relatively inexpensive fuel preheating system for an internal combustion engine that greatly improves engine performance and fuel economy. One can expect an increase in gasoline mileage from 15 to 40 percent and can further expect the engine to run smoother and cleaner as outlined herein above.

The terms "upper", "lower", "forward", "rearward", etc. have been used herein merely for the convenience for the forgoing specification and in the appended claims to describe the fuel preheating system and its parts as oriented in the drawings. It is to be understood, however, that these terms are in no way limiting to the invention since the fuel preheating system may obviously be disposed in different positions when used.

The present invention, of course, may be carried out in other specific than those herein set forth without departing from the spirit and essential characteristics of the invention. The present embodiments are, therefore, to be considered in all respects as illustrative and not restrictive and all changes coming within the meaning and equivalency range of the appended claims are intended to be embraced herein.

What is claimed is:

1. A device and system for improving the performance and fuel economy of an engine of the type having a radiator cooling system and a fuel pump for directing fuel to the carburetor, said device and system comprising: a generally elongated fuel chamber having a longitudinal axis and a pair of end walls and a connecting surrounding wall structure extending between said end walls that define a closed fuel chamber therein; fuel inlet port means formed off center in one end wall of said fuel chamber and communicatively connected to receive fuel being pumped by said fuel pump; fuel outlet port means formed off center in said other end wall of said fuel chamber and communicatively connected to a line leading to said carburetor for delivering fuel thereto and wherein said fuel inlet and outlet port means are disposed on opposite sides of said longitudinal axis of said fuel chamber; a heating line operatively connected to said radiator cooling system and extending generally centrally through said fuel chamber for heating fuel contained therein, said heating line including inlet and outlet ends formed generally centrally within opposite end walls of said fuel chamber in general parallel alignment with said fuel inlet and outlet means; said fuel inlet port means being formed in the same end wall of said fuel chamber as said outlet end of said heating line while said fuel outlet port means is formed in the opposite end wall of said fuel chamber generally adjacent said inlet end of said heating line; said inlet end of said heating line being operatively connected within said radiator cooling system to a hot water line leaving said engine such that fuel entering said fuel chamber enters the side thereof where hot water enters; and means for varying the resulting heated liquid-vapor state of fuel passing through said chamber and wherein said means for varying the resulting state of the fuel is provided for by the relative disposition of said heating line and said fuel inlet and outlet port means formed about the end walls of said fuel chamber in that by rotating said fuel chamber about said longitudinal axis of said fuel chamber and the axis of said heating line, said fuel outlet port means may be elevated with respect to said fuel inlet means and accordingly the liquid-vapor state of the existing fuel may be varied and adjusted accordingly.

* * * * *